United States Patent
Tomoda et al.

(10) Patent No.: US 10,118,774 B2
(45) Date of Patent: Nov. 6, 2018

(54) TRANSFER SYSTEM

(71) Applicant: CANON KABUSHIKI KAISHA, Tokyo (JP)

(72) Inventors: Koji Tomoda, Machida (JP); Takeshi Yamamoto, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/199,251

(22) Filed: Jun. 30, 2016

(65) Prior Publication Data
US 2017/0008709 A1    Jan. 12, 2017

(30) Foreign Application Priority Data
Jul. 7, 2015    (JP) .................. 2015-135910

(51) Int. Cl.
B65G 23/18    (2006.01)
B65G 54/02    (2006.01)
H02K 41/03    (2006.01)

(52) U.S. Cl.
CPC ............. B65G 54/02 (2013.01); H02K 41/03 (2013.01)

(58) Field of Classification Search
CPC .................................................... B65G 54/02
USPC ............................................. 198/805, 468.9
See application file for complete search history.

(56) References Cited

U.S. PATENT DOCUMENTS

| | | | |
|---|---|---|---|
| 4,850,542 A * | 7/1989 | Rechsteiner | H01F 41/08 198/690.1 |
| 5,032,975 A | 7/1991 | Yamamoto et al. | |
| 5,136,222 A | 8/1992 | Yamamoto et al. | |
| 6,078,663 A | 6/2000 | Yamamoto | |
| 6,597,790 B1 | 7/2003 | Yamamoto | |
| 6,601,519 B1 * | 8/2003 | Bindloss, Jr. | B60L 13/06 104/284 |
| 7,071,865 B2 | 7/2006 | Shibamiya et al. | |
| 7,296,234 B2 | 11/2007 | Fukuda et al. | |
| 7,496,278 B2 | 2/2009 | Miyamoto et al. | |
| 7,522,087 B2 | 4/2009 | Shibamiya et al. | |
| 8,023,802 B2 | 9/2011 | Miyamoto et al. | |
| 8,430,233 B2 * | 4/2013 | Fischer | H02K 41/033 198/805 |

(Continued)

FOREIGN PATENT DOCUMENTS

| | | |
|---|---|---|
| CN | 101689795 | 3/2010 |
| JP | H7-86772 B | 9/1995 |

(Continued)

OTHER PUBLICATIONS

Chinese Office Action issued Jul. 2, 2018 during prosecution of related Chinese application No. 201610529556.9. (Whole English-language translation included.).

*Primary Examiner* — James R Bidwell
(74) *Attorney, Agent, or Firm* — Fitzpatrick, Cella, Harper & Scinto

(57) ABSTRACT

A transfer system according to an aspect of the invention includes a stator including a plurality of coils, a carriage capable of moving along the stator, a carriage drive magnet provided on the carriage and configured to drive the carriage by magnetic force generated by the plurality of coils, and a power receiver provided on the carriage and including a power receiving magnet configured to drive an actuator by magnetic force generated by the plurality of coils.

11 Claims, 13 Drawing Sheets

(56) References Cited

U.S. PATENT DOCUMENTS

| | | | | |
|---|---|---|---|---|
| 8,827,071 B2* | 9/2014 | van de Loecht | ....... | B65G 54/02 198/619 |
| 2010/0006401 A1* | 1/2010 | Flury | ...................... | F16H 19/06 198/805 |
| 2010/0213031 A1* | 8/2010 | Krech | .................... | B60L 13/10 198/574 |
| 2015/0274433 A1* | 10/2015 | Hanisch | ................. | B65G 54/02 198/805 |
| 2016/0355350 A1* | 12/2016 | Yamamoto | ......... | G05B 19/4189 |

FOREIGN PATENT DOCUMENTS

| | | |
|---|---|---|
| JP | 2001-179568 A | 7/2001 |
| WO | 2014/067712 | 5/2014 |

* cited by examiner

|  | a | b | c | d | e | f | g | h | i | j | k | l | m |
|---|---|---|---|---|---|---|---|---|---|---|---|---|---|
|  | U | V | W | U | V | W | U | V | W | U | V | W | U |
| POS1 |  | V | W | U | V | W |  |  |  |  |  |  |  |
|  |  |  | W | U | V | W | U |  |  |  |  |  |  |
|  |  |  |  | U | V | W | U | V |  |  |  |  |  |
|  |  |  |  |  | V | W | U | V | W |  |  |  |  |
|  |  |  |  |  |  | W | U | V | W | U |  |  |  |
|  |  |  |  |  |  |  | U | V | W | U | V |  |  |
| POS2 |  |  |  |  |  |  |  | V | W | U | V | W |  |

| POSITION OF POWER RECEIVER | MOVEMENT DIRECTION | COIL | | | |
|---|---|---|---|---|---|
| | | g | h | i | J |
| POSITION FACING TWO COILS (h, i) | + | | N | S | |
| | − | | S | N | |
| | STOP | | S | S | |
| POSITION FACING ONE COIL (i) | + | | | N | S |
| | − | | | S | N |
| | STOP | | | S | |

| POSITION OF POWER RECEIVER | MOVEMENT DIRECTION | COIL | | | | | |
|---|---|---|---|---|---|---|---|
| | | g | h | i | j | k | l |
| POSITION WHERE N-POLE POWER RECEIVING MAGNET FACES TWO COILS (h, i) | + | | N | S | | N | |
| | − | | S | N | S | | |
| | STOP | | S | S | N | | |
| POSITION WHERE N-POLE POWER RECEIVING MAGNET FACES ONE COIL (i) | + | | | N | S | N | |
| | − | | S | N | N | | |
| | STOP | | | S | N | N | |

TRANSFER SYSTEM

BACKGROUND OF THE INVENTION

Field of the Invention

The present invention relates to a transfer system in which an actuator on a moving magnet linear motor carriage is driven.

Description of the Related Art

A transfer apparatus using a linear motor has heretofore been used as a transfer apparatus for transferring a workpiece between operation steps of a production apparatus. The transfer apparatus is configured to, after predetermined processing is performed on the workpiece in each operation step, transfer the workpiece to the next step in sequence. For a case of changing the orientation of the workpiece in a certain operation step, some transfer apparatus is provided, beside the transfer system, with an apparatus for changing the orientation of the workpiece in the middle of transfer of the workpiece or at the operation step. Since such a transfer apparatus changes the orientation of the workpiece by using a workpiece orientation converter in the middle of or after the transfer of the workpiece and then moves the workpiece to the next transfer or processing, there has been a problem that a large installation space needs to be allocated.

Japanese Patent Application Laid-Open No. 2001-179568 proposes a workpiece transfer apparatus provided with an orientation conversion mechanism for converting the orientation of a workpiece by moving a workpiece stage for supporting the workpiece along a guide member. The workpiece transfer apparatus proposed in Japanese Patent Application Laid-Open No. 2001-179568 is provided between machine tools, and uses the orientation conversion mechanism provided between the workpiece stage and the guide member to change the orientation of the workpiece along with the movement of the workpiece stage.

Japanese Patent Application Laid-Open No. H07-86772 proposes a transfer apparatus for transferring a workpiece held between a plurality of carriers. In the transfer apparatus proposed in Japanese Patent Application Laid-Open No. H07-86772, the workpiece is held between the two carriers, and the speeds of the two carriers are controlled according to the speed of one of the two carriers with the slower movement speed.

However, in the workpiece transfer apparatus proposed in Japanese Patent Application Laid-Open No. 2001-179568, the orientation conversion mechanism for each step needs to be installed beside the workpiece transfer apparatus, leading to the need to allocate a large installation space. In Japanese Patent Application Laid-Open No. H07-86772, the plurality of carriers need to be detected and controlled in real time in synchronization with a control cycle. Thus, in the transfer apparatus using the moving magnet linear motor, a system needs to be configured to manage and control positional information of all the carriers on a transfer path. This leads to a problem that the system would be complicated and large.

SUMMARY OF THE INVENTION

It is an object of the present invention to provide a transfer system that has a simple configuration and can be downsized.

To attain the above object, a transfer system according to an aspect of the present invention includes a stator including a plurality of coils, a carriage capable of moving along the stator, a carriage drive magnet provided on the carriage and configured to drive the carriage by magnetic force generated by the plurality of coils, and a power receiver provided on the carriage and including a power receiving magnet configured to drive an actuator by magnetic force generated by the plurality of coils.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A transfer system 10 according to a first embodiment of the present invention is described below with reference to the drawings.

Figure 1:
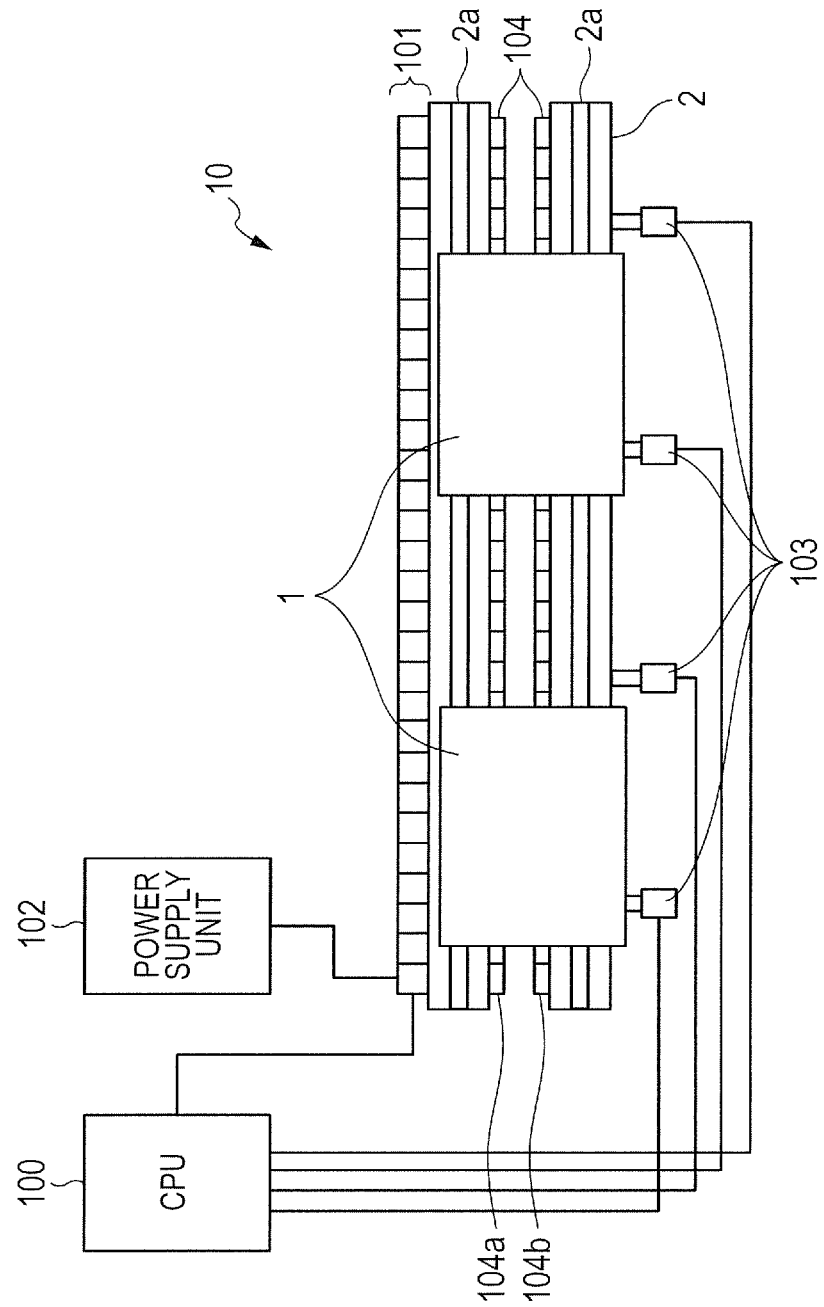
FIG. 1 is a schematic diagram showing an entire configuration of a transfer system according to a first embodiment of the present invention.

FIG. 1 is a schematic diagram showing an entire configuration of the transfer system 10 using a moving magnet linear motor. The transfer system 10 includes a plurality of carriages 1, a stationary unit 2 as a stator, a CPU 100, a drive control unit 101, a power supply unit 102, position detection units 103 and 105, and an armature 104.

The stationary unit 2 includes two guide parts 2a provided in parallel with each other. The armature 104 having a coil wound around a magnetic pole iron core is provided along a movement direction of the carriages 1 on the insides of the two guide parts 2a. On the stationary unit 2, the carriages 1 can be moved along the guide parts 2a.

The CPU (Central Processing Unit) 100 is electrically connected to the drive control unit 101 and the position detection units 103. The CPU 100 calculates a command value for electric current based on positional information of the carriages 1, and inputs the calculated value to the drive control unit 101. In the transfer system 10 according to this embodiment, a drive current to be supplied to the coil of the armature 104 on the stationary unit 2 is individually controlled by the drive control unit 101. By supplying a current to generate a moving magnetic field in the coil of the armature 104, the carriages 1 are moved along the guide parts 2a in the stationary unit 2. The power supply unit 102 is a power supply to supply a drive current to the coil of the armature 104, and is connected to the entire drive control unit 101. The position detection units 103 are attached at predetermined intervals to the stationary unit 2. The position detection units 103 detect positions of the carriages 1 and input positional information to the CPU 100.

Figure 2A:
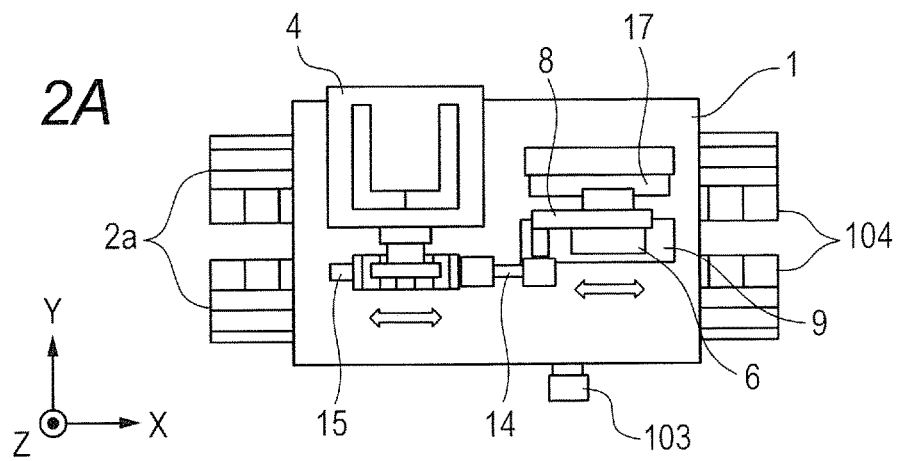
FIGS. 2A, 2B and 2C are schematic diagrams for explaining a configuration of a carriage in the transfer system according to the first embodiment of the present invention.
Figure 2B:
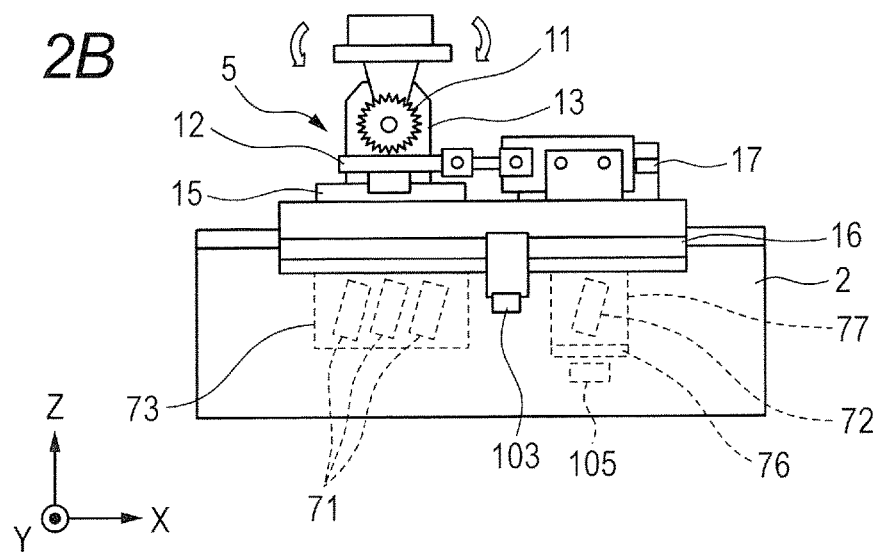
Figure 2C:
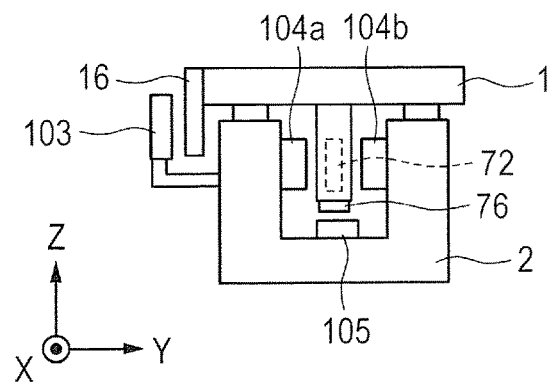

With reference to FIGS. 2A to 2C, description is given of a configuration of each of the carriages 1 according to this embodiment. FIG. 2A is a top view of the carriage 1, FIG. 2B is a side view of the carriage 1, and FIG. 2C is a front view of the carriage 1. Note that, in FIGS. 2A to 2C, it is assumed that the movement direction of the carriage 1 is the X-axis direction, a vertical direction is the Z-axis direction, and a direction perpendicular to the X-axis direction and the Z-axis direction is the Y-axis direction.

The carriage 1 further includes a holder 4, an orientation converter 5, a power receiver 6, a power transmitter 8, an opening 9, a rod end 14, a guide 15, a scale 16, a guide 17, a magnet plate 73, a scale 76, and a magnet plate 77. The holder 4 is provided on the carriage through the orientation converter 5, and holds a workpiece. The orientation converter 5 as an actuator includes a pinion gear 11, a rack gear 12, and a bearing 13. The pinion gear 11 is supported on the bearing 13 so as to be engaged with the rack gear 12, and supports the holder 4. The rack gear 12 is movably provided on the guide 15. The bearing 13 is attached and supported on the carriage 1. The guide 15 is provided so as to extend in the X-axis direction in parallel with the movement direction of the carriage 1. By the movement of the rack gear 12 on the guide 15, the pinion gear 11 is engaged with the rack gear 12 and rotated, and the holder 4 supported on the pinion gear 11 is rotated. Thus, the orientation of the workpiece held by the holder 4 can be changed.

On the side of the carriage 1, the scale 16 is provided along the movement direction thereof, in which the positional information is recorded. In the stationary unit 2, the position detection units 103 configured to acquire the positional information of the carriage 1 by reading the scale 16 on the carriage 1 are provided at predetermined positions on the side surface so as to face the scale 16. Below the carriage 1, a carriage drive magnet 71 are provided as a drive unit so as to be positioned between the armatures 104, which are stators facing each other and provided on the insides of the guide parts 2a of the stationary unit 2. The carriage drive magnet 71 include a plurality of magnets arranged along the movement direction of the carriage 1, and are fixed to the magnet plate 73. The plurality of magnets included in the carriage drive magnet 71 are arranged such that opposite poles alternately appear on the both sides facing the armatures 104 of the stationary unit 2.

The power receiver 6 includes a power receiving magnet 72 and the scale 76. The power receiver 6 extends in the Z-axis direction through the opening 9, is connected to the power transmitter 8 on the carriage 1, and is disposed so as to be movable along the guide 17. The guide 17 is provided so as to extend in the X-axis direction in parallel with the opening 9.

The power receiving magnet 72 is fixed to the magnet plate 77 and is provided so as to be positioned between the armatures 104 facing each other and provided on the insides of the guide parts 2a of the stationary unit 2. A moving magnetic field generated by supplying currents to the coils of the armatures 104 at the positions facing the power receiving magnet 72 generates force parallel to the movement direction of the carriage 1 to the power receiver 6.

On the lower surface of the power receiver 6, the scale 76 is provided. The position detection unit 105 is provided at a position facing the scale 76 on the inside bottom of the stationary unit 2. The position detection unit 105 detects the position of the power receiver 6 by reading the scale 76. Note that the position detection unit 105 may be disposed at a stop position of the carriage 1 or may be disposed at a predetermined interval. By disposing the position detection unit 105 at the predetermined interval, movement control of the power receiver 6 can be performed while driving the carriage 1.

The power transmitter 8 is connected to the rack gear 12 through the rod end 14. With the linear movement of the power receiver 6 along the guide 17, the power transmitter 8 linearly moves forward or backward in the X-axis direction, and the rack gear 12 moves along the guide through the rod end 14. More specifically, with a change in the position of the rack gear 12, the pinion gear 11 is rotated, and the orientation of the workpiece held by the holder 4 is changed. When the power receiver 6 is moved toward the orientation converter 5, the holder 4 is tilted in a clockwise direction. On the other hand, when the power receiver 6 is moved in a direction away from the orientation converter 5, the holder 4 is tilted in a counterclockwise direction. The opening 9 is provided parallel to the guide 17 in the carriage 1 such that the power receiver 6 is movable therein. The opening 9 is formed so as to extend in the X-axis direction to the length at which the holder 4 can be tilted to a predetermined position when the power receiver 6 is positioned at each end in the longitudinal direction of the opening 9.

Figure 3:
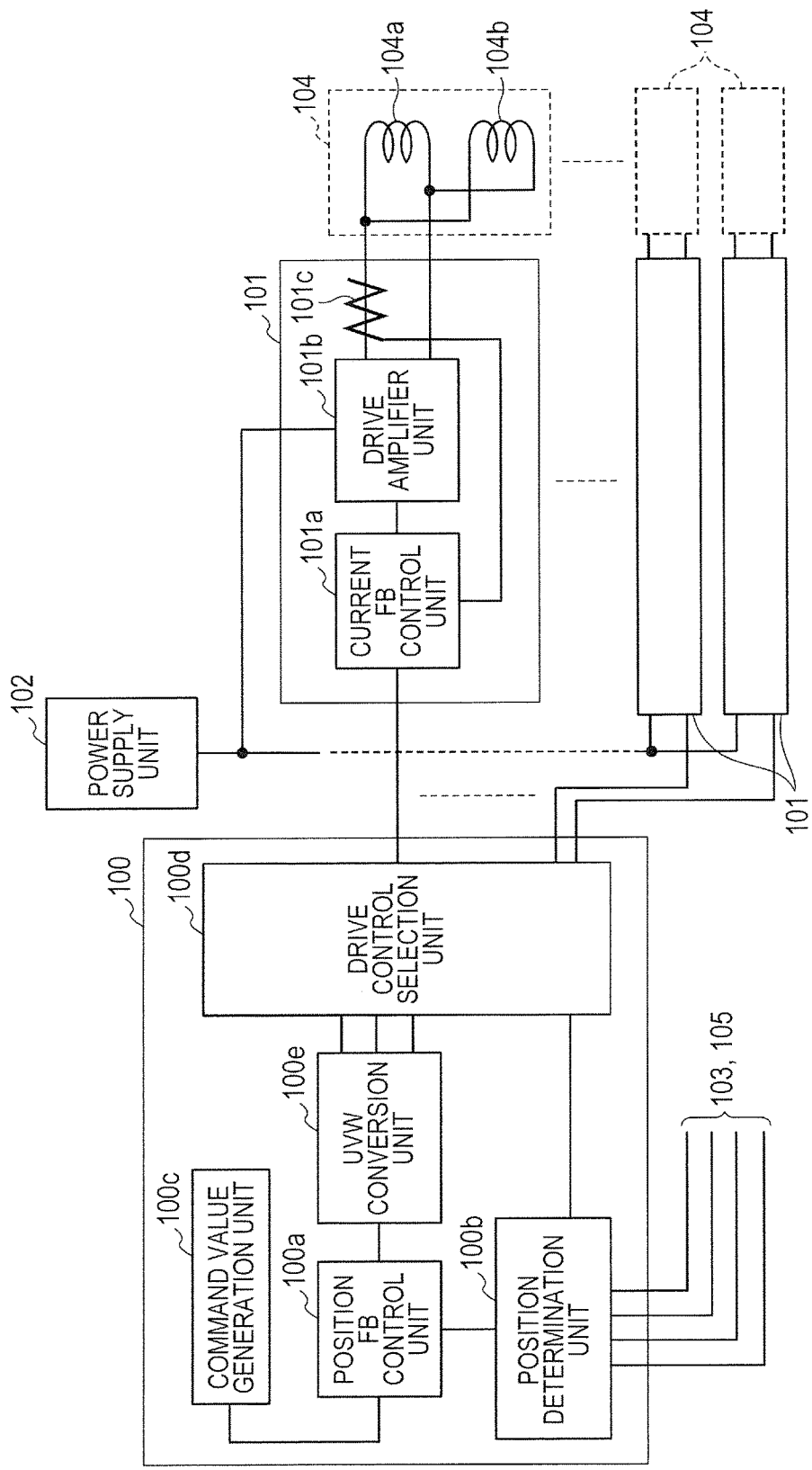
FIG. 3 is a block diagram of the transfer system according to the first embodiment of the present invention.

FIG. 3 is a block diagram of this embodiment. With reference to FIG. 3, this embodiment is described in detail below. The CPU 100 includes a position FB (Feed Back) control unit 100a, a position determination unit 100b, a command value generation unit 100c, a drive control selection unit 100d, and a UVW conversion unit 100e. Note that, although the CPU 100 also has other functions, description thereof is omitted in this embodiment.

The position determination unit 100b determines the position of the carriage 1 and the position of the power receiver 6. To be more specific, signals indicating the positional information from the position detection units 103 and 105 are inputted to the position determination unit 100b, and the position determination unit 100b determines positional information of the carriage 1 and the power receiver 6 based on the signals from the position detection units 103 and 105.

The command value generation unit 100c generates position commands for the carriage 1 and the power receiver 6, and inputs the generated position commands to the position FB control unit 100a. The position commands generated by the command value generation unit 100c are target positions of the carriage 1 to be controlled. When a signal inputted to the position determination unit 100b is the signal from the position detection unit 103, the command value generation unit 100c generates the position command for the carriage 1. On the other hand, when a signal inputted to the position determination unit 100b is the signal from the position detection unit 105, the command value generation unit 100c generates the position command for the power receiver 6.

The position FB control unit 100a compares the position of the carriage 1 and the position of the power receiver 6, which are determined by the position determination unit 100b, with the position commands generated by the command value generation unit 100c, and outputs the result thereof as control information to the UVW conversion unit 100e. To be more specific, when the position of the carriage 1 is determined by the position determination unit 100b, the position FB control unit 100a compares the position of the carriage 1 with the position command generated by the command value generation unit 100c, and outputs the result thereof as control information of the carriage 1 to the UVW conversion unit 100e. On the other hand, when the position of the power receiver 6 is determined by the position determination unit 100b, the position FB control unit 100a compares the position of the power receiver 6 with the position command generated by the command value generation unit 100c, and outputs the result thereof as control information of the power receiver 6 to the UVW conversion unit 100e. The UVW conversion unit 100e converts the control information into three-phase AC command values having different phases, and outputs the command values to the drive control selection unit 100d.

The drive control selection unit 100d selects the coil of the armature 104, through which the drive current flows, based on the positional information of the carriage 1 and the positional information of the power receiver 6, which are determined by the position determination unit 100b, and inputs a command value from the CPU 100 to the drive control unit 101 connected to the selected coil. To be more specific, when the position of the carriage 1 is determined by the position determination unit 100b, the drive control selection unit 100d selects the coil of the armature 104, through which the drive current flows, based on the positional information of the carriage 1, and inputs the command value to the drive control unit 101 connected to the selected coil. On the other hand, when the position of the power receiver 6 is determined by the position determination unit 100b, the drive control selection unit 100d selects the coil of the armature 104, through which the drive current flows, based on the positional information of the power receiver 6, and inputs the command value to the drive control unit 101 connected to the selected coil.

The drive control unit 101 includes a current FB (Feed Back) control unit 101a, a drive amplifier unit 101b, and a current detection unit 101c. The drive control unit 101 is connected to the armature 104. A coil 104a and a coil 104b, which are provided at positions facing each other shown in FIG. 2C, are connected to the same drive control unit 101 as shown in FIG. 3. As for the magnetic poles excited by the drive currents flowing through the coils 104a and 104b, the drive control unit 101 and the coils 104a and 104b are connected to each other such that the opposite poles alternately appear.

The current FB control unit 101a compares the command value inputted from the CPU 100 with the current value detected by the current detection unit 101c, and generates current command values to be outputted to the coils 104a and 104b based on the result thereof. The drive amplifier unit 101b controls the currents to flow through the coils 104a and 104b based on the command values inputted from the current FB control unit 101a. The current detection unit 101c measures the currents flowing through the coils 104a and 104b, and inputs the measured current values to the current FB control unit 101a. By performing such current feedback control, the responsiveness of the carriage 1 and the power receiver 6 can be further improved.

Figures 4A, 4B:
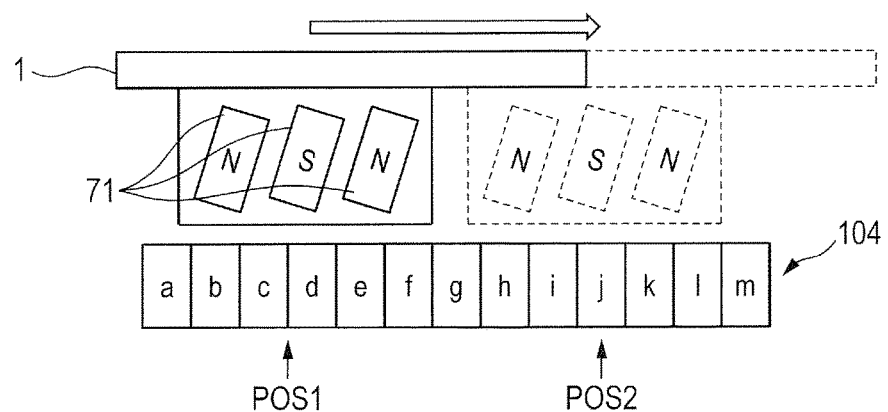
FIGS. 4A and 4B are diagrams for explaining a method for controlling the carriage in the transfer system according to the first embodiment of the present invention.

FIG. 4A is a diagram schematically showing a positional relationship between the carriage drive magnets provided below the carriage 1 and the coils of the armature 104. FIG. 4B is a table showing the coils to which the drive currents are supplied when the carriage 1 is moved from a position POS1 to a position POS2.

The three coils consecutively arranged in the armature 104 are set to have U-phase, V-phase, and W-phase, respectively, and three-phase AC currents having phases different by 120° from each other are supplied to the coils to generate a moving magnetic field. Thus, electromagnetic force is generated between the armature 104 and the carriage drive magnets 71, and the carriage 1 is moved by drive force generated by the electromagnetic force. The CPU 100 calculates the coils to which the three-phase AC currents are to be supplied and currents to be supplied to the respective phases, based on the positional information and movement direction of the carriage 1, and inputs the result thereof to the drive control unit 101. The coils to which the drive currents are supplied are selected by the drive control selection unit 100d based on the positional information of the carriage 1, and switch control thereof is sequentially performed according to the movement of the carriage 1.

For example, when it is determined that the carriage 1 is located at the position POS1, the drive current is supplied to the coils b to f facing the carriage drive magnets 71. To be more specific, the drive control unit 101 supplies a U-phase AC current to the coil d, V-phase AC currents to the coils b and e, and W-phase AC currents to the coils c and f. As shown in FIG. 4B, the coils to which the AC currents are supplied and the phases of the AC currents change according to the positions of the carriage 1 by the time the carriage 1 is moved from the position POST to the position POS2. Thus, electromagnetic force is generated between the armature 104 and the carriage drive magnets 71 where the carriage 1 is positioned, and the carriage 1 is moved toward the position POS2 by drive force generated by the electromagnetic force.

At the destination position POS2 of the carriage 1, the S-pole magnet in the carriage drive magnets 71 faces the coil j. Thus, the coils to which the drive current is supplied are the coils h to l. To be more specific, the drive control unit 101 supplies a U-phase AC current to the coil j, V-phase AC currents to the coils h and k, and W-phase AC currents to the coils i and l. Thus, movement control of the carriage 1 can be performed by switching the coils to which the drive currents are supplied according to the positional information of the carriage 1.

Figure 5:
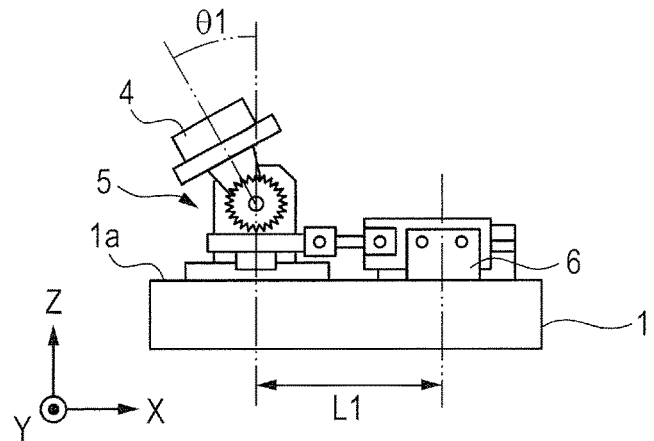
FIG. 5 is a schematic diagram for explaining a method for controlling a power receiver in the transfer system according to the first embodiment of the present invention.

FIG. 5 is a schematic diagram for explaining a method for controlling the power receiver 6. With reference to FIG. 5, description is given of a change in orientation of the holder 4 according to movement of the power receiver 6. Assuming that the orientation of the holder 4 parallel to the upper surface 1a of the carriage 1 is 0°, and that an interval between the carriage 1 and the power receiver 6 in this event is L0, an orientation angle θ1 of the holder 4 illustrated in FIG. 5 and an interval L1 between the orientation converter 5 and the power receiver 6 have a relationship represented by the following Equation 1.

$$L1=L0+K1\times\theta 1 \qquad \text{Equation 1}$$

In Equation 1, K1 is a coefficient determined by the pitch between the rack gear 12 and the pinion gear 11, which represents a movement amount of the power receiver 6 per unit angle. Note that the interval L1 in FIG. 5 represents the interval when the orientation angle is 0°. When the holder 4 is tilted to the orientation angle θ1, the interval L1 is the interval between approximately the center of the holder 4 and the power receiver 6. The interval L1 changes according to the orientation of the holder 4.

Figure 6:
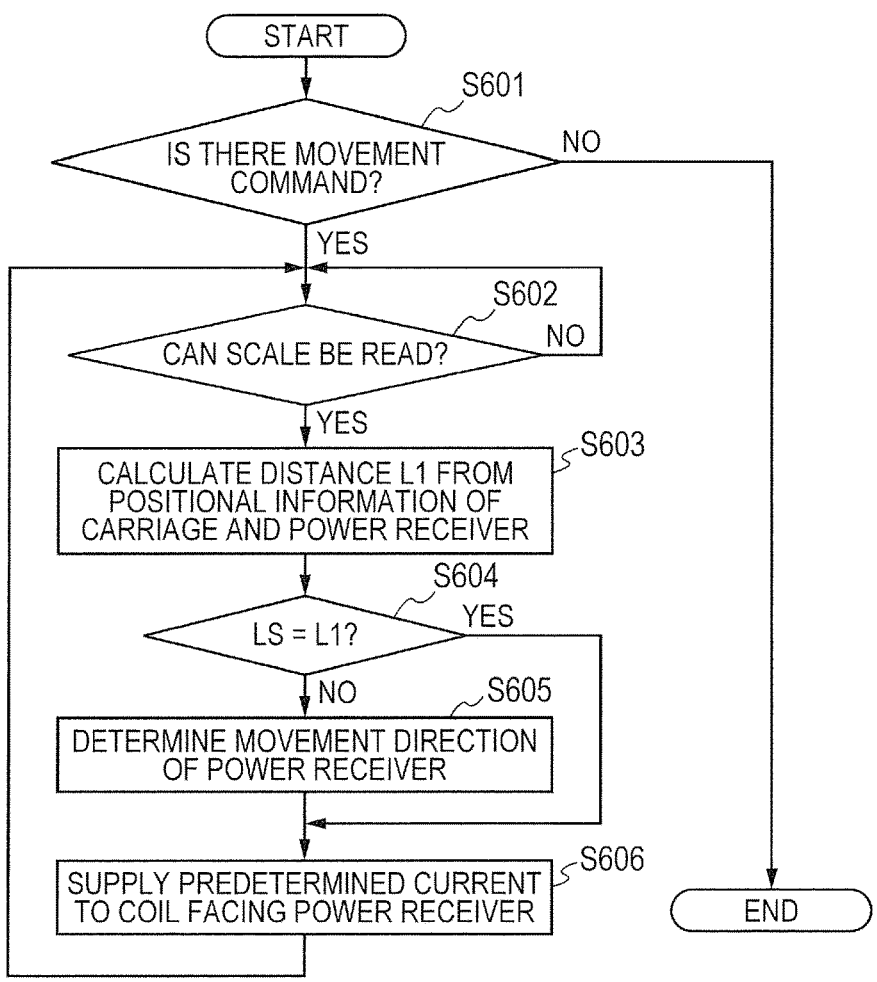
FIG. 6 is a flowchart showing the method for controlling the power receiver in the transfer system according to the first embodiment of the present invention.

FIG. 6 is a flowchart showing processing by the CPU 100 in the case of moving the power receiver 6. With reference to FIG. 6, drive control of the power receiver 6 is described. In Step S601, the CPU 100 determines whether or not there is a movement command for the power receiver 6. The movement command is a command when the orientation of the holder 4 needs to be changed. When there is a movement command (Step S601: Yes), the CPU 100 determines whether or not the scale 76 can be read (Step S602). When there is no movement command (Step S601: No), this flowchart is terminated.

In Step S602, the CPU 100 determines whether or not the scale 76 provided on the lower side of the power receiver 6 can be read by the position detection unit 105. When the scale 76 can be read (Step S602: Yes), the interval L1 between the orientation converter 5 and the power receiver 6 is calculated (Step S603). When the scale 76 cannot be read (Step S602: No), the CPU 100 waits for the power receiver 6 to be moved to the position where the scale 76 can be read by the position detection unit 105. In Step S603, the CPU 100 uses Equation 1 to calculate the interval L1 between the orientation converter 5 and the power receiver 6. As for the orientation angle θ1 in Equation 1, a value stored in an unillustrated memory may be used. Alternatively, the orientation angle may be calculated using a movement amount from the position of the pinion gear 11 when the orientation angle stored in the memory is 0°. Thus, the orientation of the holder 4 is determined.

In Step S604, the CPU 100 compares a command value LS calculated from the orientation angle to which the holder 4 is wished to be changed with the interval L1 calculated in Step S603. When the command value LS is equal to the interval L1 (Step S604: Yes), the CPU 100 stops the power receiver 6 (Step S606). When the command value LS is different from the interval L1 (Step S604: No), the CPU 100 determines the movement direction of the power receiver 6 (Step S605).

In Step S605, the CPU 100 determines the movement direction of the power receiver 6. To be more specific, the CPU 100 determines whether the interval L1 is larger or smaller than the command value LS to determine the direction of moving the power receiver 6. When the interval L1 is larger than the command value LS, the orientation of the holder 4 has been changed larger than the orientation angle to which the holder 4 is wished to be changed, and thus the orientation of the holder 4 needs to be changed toward the power receiver 6. On the other hand, when the interval L1 is smaller than the command value LS, the orientation of the holder 4 has been changed smaller than the orientation angle to which the holder 4 is wished to be changed, and thus the orientation of the holder 4 needs to be changed in a direction opposite to the power receiver 6.

In Step S606, the CPU 100 supplies a predetermined current to the coil facing the power receiving magnet 72. To be more specific, in the case of moving the power receiver 6, the CPU 100 supplies a predetermined current to move the power receiver 6 in the movement direction determined in Step S605. Thus, the power receiver 6 is moved in the determined direction. In the case of stopping the power receiver 6, on the other hand, the CPU 100 supplies a predetermined current to stop the power receiver 6 to the coil facing the power receiving magnet 72. Thus, the power receiver 6 is stopped. Further details about this are described with reference to FIGS. 7A and 7B.

Figures 7A, 7B:
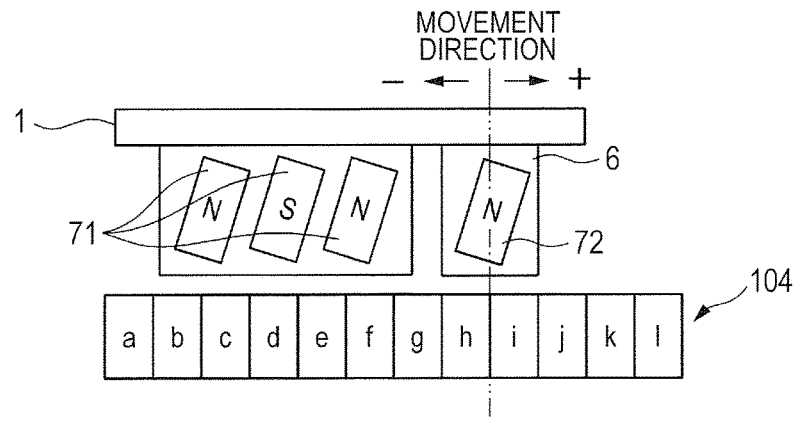
FIGS. 7A and 7B are diagrams for explaining the method for controlling the power receiver in the transfer system according to the first embodiment of the present invention.

FIG. 7A is a schematic diagram showing a positional relationship between the power receiving magnet provided below the carriage 1 and the coils of the armature 104. FIG. 7B is a table showing the coils to which the drive currents are supplied in the case of moving or stopping the power receiver 6. The table also shows the magnetic poles excited in the coils by the supplied drive currents.

The power receiver 6 uses a method for moving a linear pulse motor of one pole of the power receiving magnet 72 to select a coil to which a drive current is to be supplied based on the positional information of the power receiver 6 determined by the position determination unit 100b in the CPU 100. The power receiver 6 is driven by applying a pulsed voltage to the selected coil.

As shown in FIG. 7A, in order to move the power receiver 6 in the + direction when the power receiver 6 is located at the position facing the coils h and i, the CPU 100 supplies a current to excite the N-pole to the coil h and a current to excite the S-pole to the coil i. Thus, the power receiver 6 is moved to the position facing the coil i. In the case of further moving the power receiver 6 in the + direction, the CPU 100 supplies a current to excite the N-pole to the coil i and a current to excite the S-pole to the coil j. Thus, the power receiver 6 is moved to the position facing the coils i and j.

In the case of stopping the power receiver 6 at the position facing the coils i and j, the CPU 100 supplies a current to excite the S-pole to the coil i and a current to excite the S-pole to the coil j. Thus, the power receiver 6 is stopped at the position facing the coils i and j.

In order to move the power receiver 6 in the − direction when the power receiver 6 is located at the position facing the coils h and i, the CPU 100 supplies a current to excite the S-pole to the coil h and a current to excite the N-pole to the coil i. Thus, the power receiver 6 is moved to the position facing the coil h.

In order to move the power receiver 6 in the − direction when the power receiver 6 is located at the position facing the coil i, the CPU 100 supplies a current to excite the S-pole to the coil h and a current to excite the N-pole to the coil i. Thus, the power receiver 6 is moved to the position facing the coils h and i.

In the case of stopping the power receiver 6 at the position facing the coil i, the CPU 100 supplies a current to excite the S-pole to the coil i. Thus, the power receiver 6 is stopped at the position facing the coil i.

As described above, the movement control of the power receiver 6 can be performed by switching the coils to which the drive currents are supplied according to the position of the power receiver 6. Moreover, according to the command value from the CPU 100, the coils to drive the carriage 1 and the coils to drive the power receiver 6 can be individually controlled. Thus, the orientation of the holder 4 can be controlled regardless of the drive state of the carriage 1.

As described above, according to this embodiment, the power receiver 6 is provided to apply force to the orientation converter 5 through the power transmitter 8 and the rod end 14 in the carriage 1. Thus, in one carriage 1, force associated with the movement of the power receiver 6 can be transmitted to the orientation converter 5 through the power transmitter 8. Thus, the transfer system 10 can be downsized with a simple configuration without the need to provide an apparatus for changing the orientation of the holder 4.

Second Embodiment

Next, a second embodiment of the present invention is described with reference to the drawings. This embodiment is different from the first embodiment in that a power receiver 6 includes two magnets. The same configurations as those in the first embodiment are denoted by the same reference numerals, and description thereof is omitted.

Figures 8A, 8B:
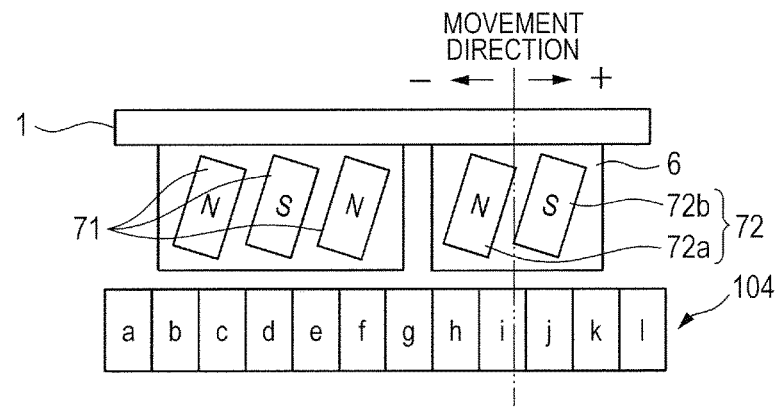
FIGS. 8A and 8B are diagrams for explaining a method for controlling a power receiver in a transfer system according to a second embodiment of the present invention.

FIG. 8A is a schematic diagram showing a positional relationship between a power receiving magnet 72 provided below a carriage 1 and coils of an armature 104 according to this embodiment. FIG. 8B shows the coils to which drive currents are supplied in the case of moving or stopping the power receiver 6. FIG. 8B also shows magnetic poles excited in the coils by the supplied drive currents.

As shown in FIG. 8A, the power receiving magnet 72 includes two magnets with N-pole and S-pole. Since the power receiving magnet 72 includes two magnets 72a and 72b, power to be obtained by the power receiver 6 is increased compared with the case where the power receiving magnet 72 includes one magnet. Thus, even in a case where the mass of a workpiece to be transferred by the carriage 1 is increased, and power required to change the orientation of a holder 4 is increased, it is possible to easily deal with the case.

In order to move the power receiver 6 in the + direction when the N-pole magnet 72a in the power receiving magnet 72 faces the coils h and i, and the S-pole magnet 72b faces the coil j, the CPU 100 supplies currents as follows. More specifically, the CPU 100 supplies a current to excite the N-pole to the coil h, a current to excite the S-pole to the coil i, and a current to excite the N-pole to the coil k. Thus, the power receiver 6 is moved to the position where the N-pole magnet 72a in the power receiving magnet 72 faces the coil i.

In the case of further moving the power receiver 6 in the + direction, the CPU 100 supplies a current to excite the N-pole to the coil i, a current to excite the S-pole to the coil j, and a current to excite the N-pole to the coil l. Thus, the power receiver 6 is moved to the position where the N-pole magnet 72a in the power receiving magnet 72 faces the coils i and j. In the case of stopping the power receiver 6 at the position where the N-pole magnet 72a faces the coils i and j, the CPU 100 supplies a current to excite the S-pole to the coil i, a current to excite the S-pole to the coil j, and a current to excite the N-pole to the coil k. Thus, the power receiver 6 is stopped at the position where the N-pole magnet 72a faces the coils i and j.

As described above, in this embodiment, since the power receiving magnet 72 includes more than one magnet, the orientation can be easily changed even when the mass of the workpiece is increased.

Third Embodiment

Next, a third embodiment of the present invention is described with reference to the drawings. This embodiment is different from the first embodiment in including lock units to restrict the movement of a power transmitter 8. The same configurations as those in the first embodiment are denoted by the same reference numerals, and description thereof is omitted.

Figure 9A:
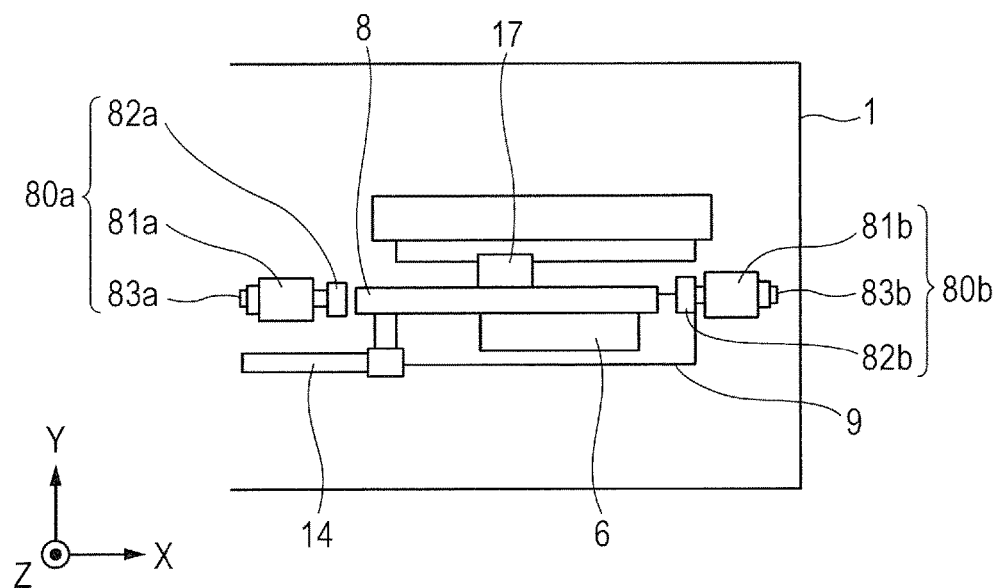
FIGS. 9A and 9B are partially enlarged views showing a configuration of a power receiver on a carriage in a transfer system according to a third embodiment of the present invention.
Figure 9B:
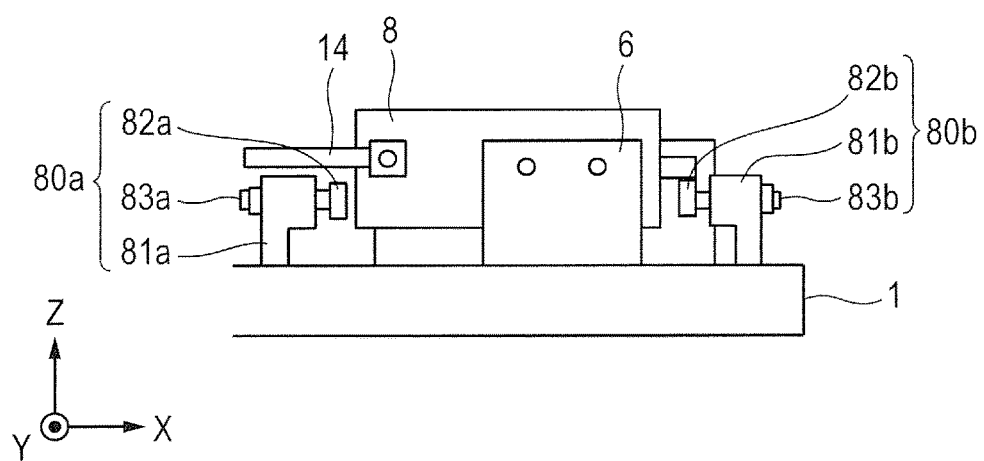

FIG. 9A is a top view of a carriage 1, and FIG. 9B is a side view of the carriage 1. In the carriage 1, a pair of lock units 80a and 80b are attached to the both ends of the power transmitter 8 along the movement direction of a power receiver 6 such that the power transmitter 8 is disposed between the lock units 80a and 80b. The lock unit 80a includes a stopper 81a, a fixing magnet 82a, and a positioning screw 83a. The lock unit 80b includes a stopper 81b, a fixing magnet 82b, and a positioning screw 83b.

The stopper 81a is attached around the opening end of an opening 9 on the holder 4 side on the carriage 1, and the stopper 81b is attached around the opening end of the opening 9 opposite to the stopper 81a. The fixing magnets 82a and 82b are attached such that the power transmitter 8 is disposed between the fixing magnets 82a and 82b. The positions of the fixing magnets 82a and 82b can be adjusted by turning the positioning screws 83a and 83b as an adjuster, and the position for fixing the power transmitter 8 can be adjusted to a desired position. Thus, the orientation angle of the holder 4 can be adjusted to an angle required for each operation step.

By moving the power receiver 6 using the method described in the first embodiment, the power transmitter 8 is moved together with the power receiver 6. When the moved power transmitter 8 comes into contact with the fixing magnet 82a or the fixing magnet 82b, the movement of the power receiver 6 and the movement of the power transmitter 8 are restricted. Since the movement of the power transmitter 8 is restricted by the fixing magnet 82a or the fixing magnet 82b, the position of the rack gear 12 can be fixed.

The power transmitter 8 is connected to the rack gear 12 through the rod end 14. Thus, the movement of the rack gear 12 is also restricted by fixing the position of the power transmitter 8. Accordingly, the orientation angle of the holder 4 is fixed. Moreover, when the power transmitter 8 includes a magnetic member, the power transmitter 8 is attracted by the magnetic force of the fixing magnet 82a or the fixing magnet 82b when approaching the fixing magnet 82a or the fixing magnet 82b. Thus, the position of the power transmitter 8 is fixed.

As described above, in this embodiment, the position of the power transmitter 8 can be fixed without supplying a current to stop the power receiver 6 to the coils of the armature 104. Thus, the orientation angle of the holder 4 can be fixed to a desired angle.

Fourth Embodiment

Next, a fourth embodiment of the present invention is described with reference to the drawings. This embodiment is different from the first embodiment in a configuration of a carriage drive magnet 471 and a power receiving magnet 472 as well as a stationary unit 2, and in that position detection of a carriage 401 and position detection of a power receiver 6 are performed by the same position detection unit 103. The same configurations as those in the first embodiment are denoted by the same reference numerals, and description thereof is omitted.

Figure 10A:
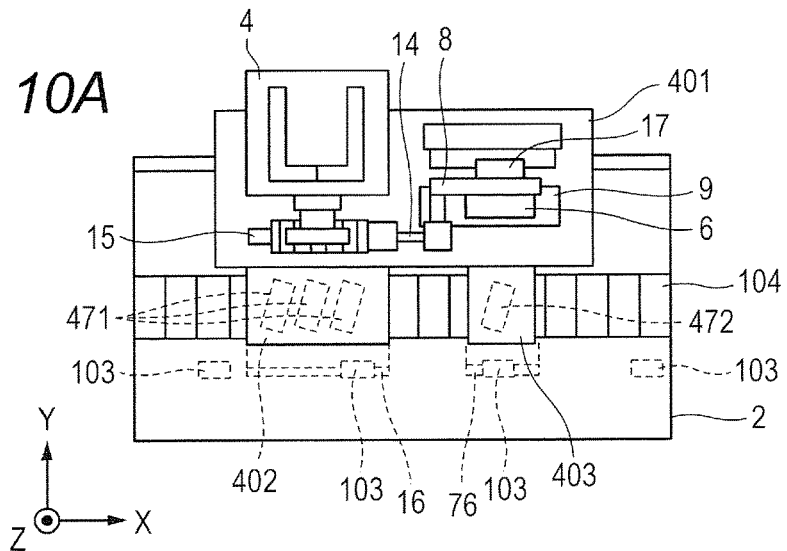
FIGS. 10A, 10B and 10C are schematic diagrams for explaining a configuration of a carriage in the transfer system according to a fourth embodiment of the present invention
Figure 10B:
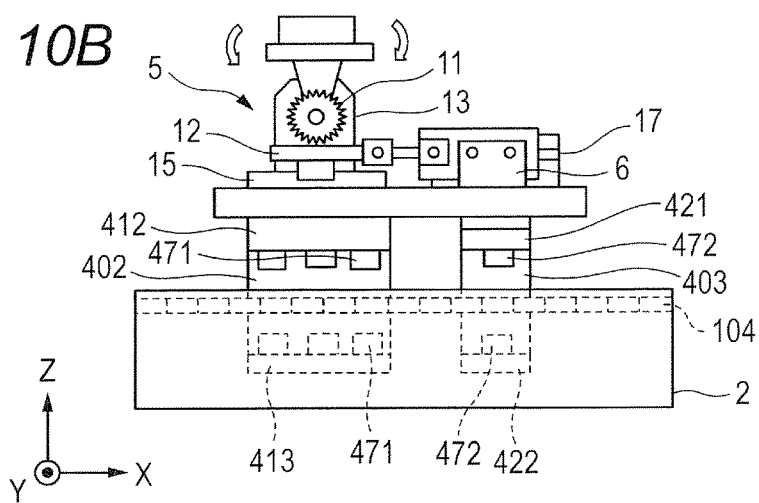
Figure 10C:
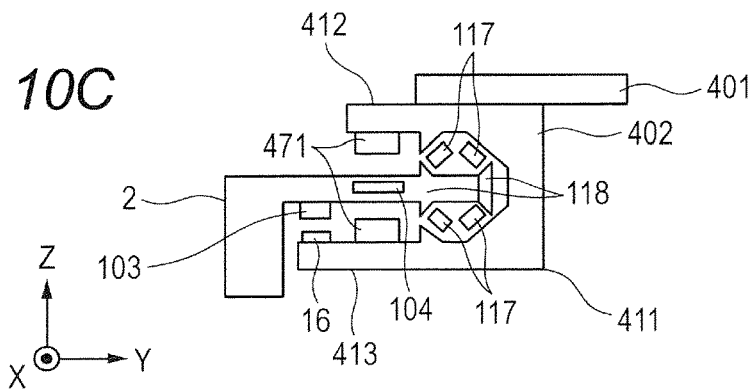

FIG. 10A is a top view of the carriage 401 in a transfer system 10 according to this embodiment. FIG. 10B is a side view of the carriage 401. FIG. 10C is a front view of the carriage 401. The stationary unit 2 includes position detection units 103, an armature 104, and guide rails 118. A plurality of the position detection units 103 are provided in the stationary unit 2 at predetermined intervals. The guide rails 118 are formed corresponding to the positions of an edge portion of the stationary unit 2 and guide rollers 117 each disposed away from the edge portion by a certain distance.

The carriage 401 includes a magnet plate 402. The magnet plate 402 is attached to the lower side in the vertical direction of the carriage 401. The magnet plate 402 has a U-shape and includes a guide part 411, a first attachment part 412, and a second attachment part 413. The guide part 411 includes the plurality of guide rollers 117 on its inner wall. The guide rollers 117 are attached above and below the guide rails 118 in the vertical direction along the two guide rails 118 provided in the stationary unit 2. The carriage 401 can be moved along the guide rails 118.

The first attachment part 412 extends along the carriage 401 from the upper portion of the guide part 411, and protrudes outward from the end of the carriage 401. The second attachment part 413 extends parallel to the first attachment part 412 from the lower portion of the guide part 411, and protrudes more than the first attachment part 412. The first attachment part 412 and the second attachment part 413 include a plurality of pairs of carriage drive magnets 471. Each pair of the carriage drive magnets 471 are disposed in the first attachment part 412 and the second attachment part 413 so as to face the armature 104 in the stationary unit 2. In the second attachment part 413, a scale 16 is attached at a position facing the position detection unit 103 in the stationary unit 2.

The power receiver 6 includes a magnet plate 403. The magnet plate 403 is attached to the lower side in the vertical direction of the carriage 401. The magnet plate 403 has the same shape as that of the magnet plate 402 shown in FIG. 10C. A first attachment part 421 and a second attachment part 422 of the magnet plate 403 includes power receiving magnets 472 at positions facing the armature 104 in the stationary unit 2, respectively. In the second attachment part 422, a scale 76 is attached at a position facing the position detection units 103 in the stationary unit 2. Thus, the position detection of the carriage 401 and the position detection of the power receiver 6 can be performed by the same position detection units 103.

As shown in FIG. 10B, the stationary unit 2 is disposed between a pair of the carriage drive magnets 471 arranged facing each other. The stationary unit 2 is disposed between a pair of the power receiving magnets 472 arranged facing each other. The stationary unit 2 and the guide rails 118 have the linear shape in FIGS. 10A to 10C, but can also be configured to have a shape curved in the traveling direction of the carriage as shown in FIG. 11.

Figure 11:
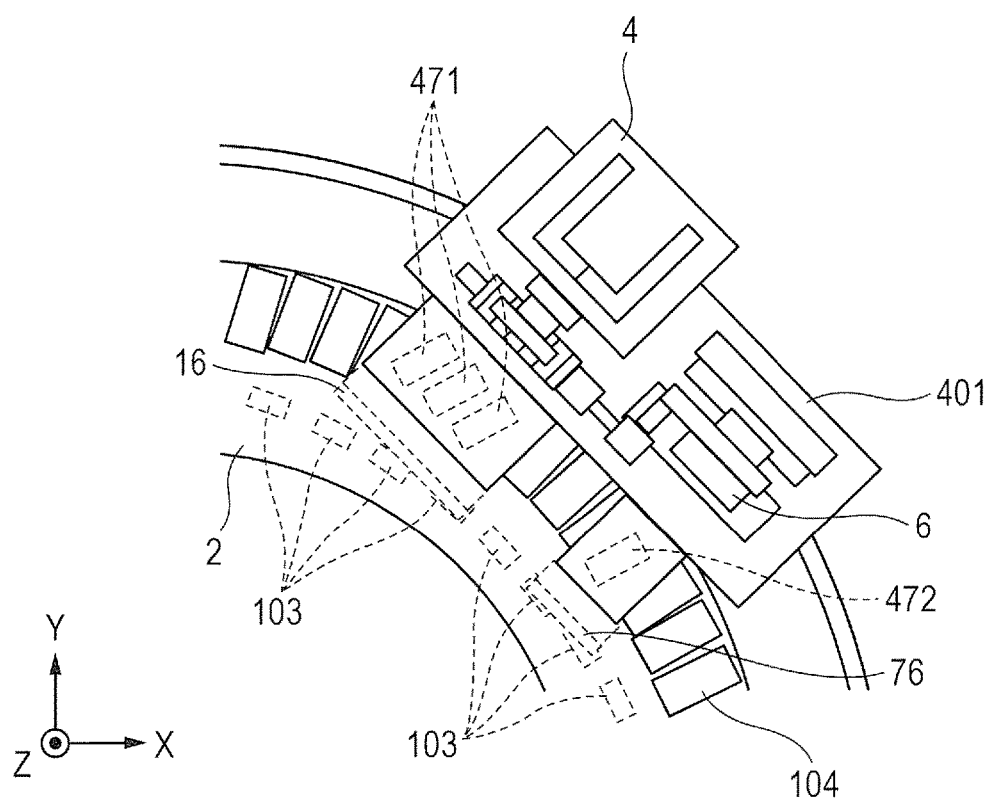
FIG. 11 is a schematic diagram showing a fixation unit having a curved shape in a transfer system according to the fourth embodiment of the present invention.

FIG. 11 is a schematic diagram showing the stationary unit 2 having a curved shape. The carriage 401 has a configuration in which the stationary unit 2 including the armature 104 is sandwiched by the carriage drive magnets 471 and the power receiving magnet 472. Thus, the carriage drive magnets 471 and the power receiving magnet 472 do not come into contact with the armature 104. The coils in the armature 104 are provided in series as in the case of the linear stationary unit 2. The position detection units 103 are provided at predetermined intervals at positions where the scale 16 and the scale 76 can be read. Accordingly, the movement control of the power receiver 6 can be performed regardless of the drive state of the carriage 401. Thus, the orientation control of the holder 4 can be performed while performing the movement control of the carriage 401.

As described above, in this embodiment, the carriage 401 has the configuration in which the armature 104 is sandwiched by the carriage drive magnets 71 and the power receiving magnet 72. Thus, smooth movement control of the carriage 401 can be performed even when the stationary unit 2 is curved.

Fifth Embodiment

Next, a fifth embodiment of the present invention is described with reference to the drawings. This embodiment is different from the first embodiment in including two power receivers 6. The same configurations as those in the first embodiment are denoted by the same reference numerals, and description thereof is omitted.

Figure 12A:
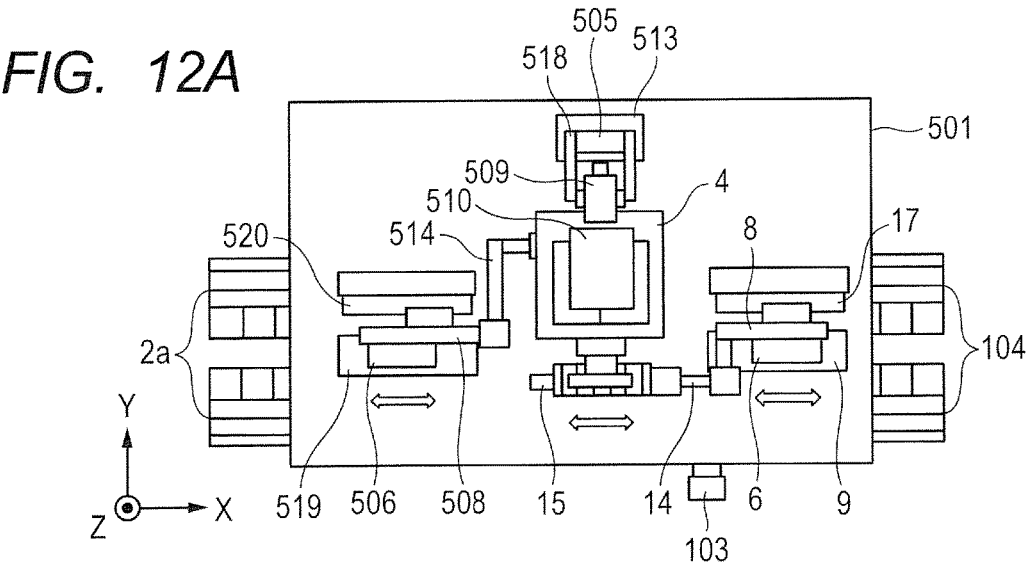
FIGS. 12A, 12B and 12C are schematic diagrams showing a transfer system according to a fifth embodiment of the present invention.
Figure 12B:
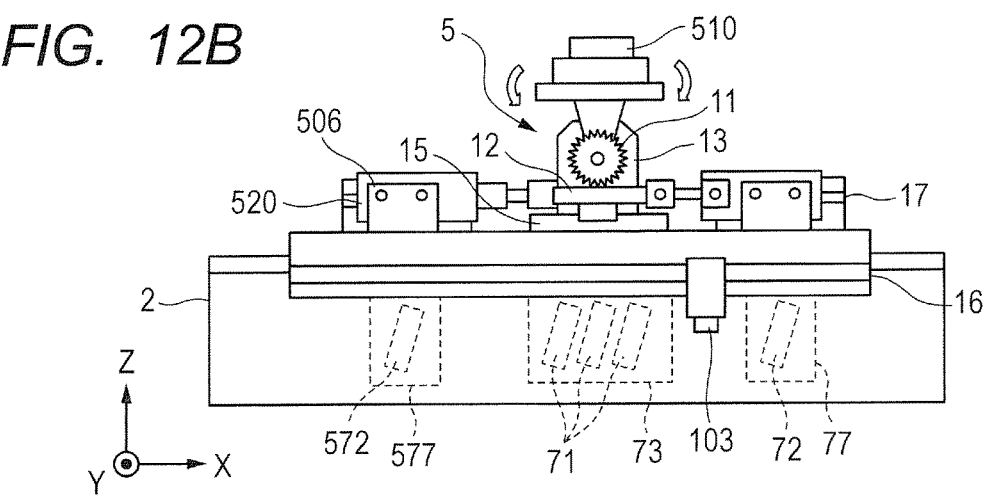
Figure 12C:
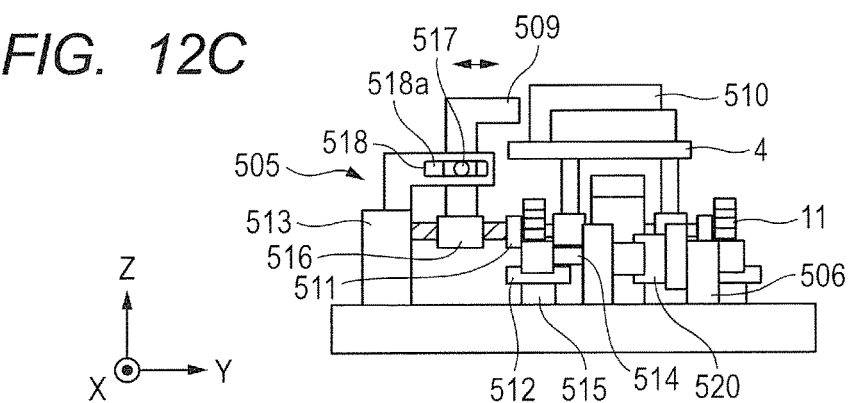

FIG. 12A is a top view of a carriage 501 in a transfer system 10 according to this embodiment. FIG. 12B is a side view of the carriage 501. FIG. 12C is a front view of the carriage 501. The carriage 501 includes a workpiece fixation unit 505, a power receiver 506, a power transmitter 508, a rod end 514, and guides 515 and 520. The power receivers 6 and 506 are disposed at both sides of a holder 4, respectively. The power receiver 506 includes a power receiving magnet 572. An opening 519 is provided in the carriage 501, and the power receiver 506 is connected to the power transmitter 508 through the opening 519.

The power receiving magnet 572 is fixed to a magnet plate 577, and is provided so as to be positioned between the armatures 104 provided facing each other on the insides of guide parts 2a of the stationary unit 2.

The workpiece fixation unit 505 includes a butting part 509, a guide roller 517, a guide part 518, a bearing 513, a ball screw 516, a pinion gear 511, and a rack gear 512. The power receiver 6 is attached to the workpiece fixation unit 505.

The power receiver 506 is linearly moved inside the opening 519 along the guide 520 placed parallel to the movement direction of the carriage 501. The power transmitter 508 is connected to the rack gear 512 through the rod end 514, and the power receiver 506 is linearly moved along the guide 520 by the force of a moving magnetic field generated in the armature 104. Thus, the rack gear 512 is moved in the X-axis direction along the guide 515, and the position of the rack gear 512 is changed. The pinion gear 511 is disposed so as to be engaged with the rack gear 512 through the bearing 513 and the ball screw 516. The pinion gear 511 is supported by the ball screw 516 and the bearing 513 so as to be rotatable by the movement of the rack gear 512 in the X-axis direction.

The butting part 509 is connected to a nut of the ball screw 516, and the guide roller 517 is provided so as to protrude at a position corresponding to a guide hole 518a of the guide part 518. The guide roller 517 is disposed so as to be slidable along the guide hole 518a. By the rotation of the ball screw 516, the guide roller 517 attached to the butting part 509 is moved along the guide hole 518a. An edge of the butting part 509 is provided at a position facing a workpiece 510 held by the holder 4.

Next, description is given of control for moving the butting part 509 toward the workpiece 510 by moving the power receiver 506 using the same drive method as that in the first embodiment. The power receiver 506 is moved by the moving magnetic field generated by the armature 104, and thus the power transmitter 8 is linearly moved along the guide 520, and the rack gear 512 is moved along the guide 515 through the rod end 514. With the movement of the rack gear 512, the pinion gear 511 is rotated to move the butting part 509 toward the workpiece 510 through the ball screw 516. Thus, the butting part 509 comes into contact with the workpiece 510, thereby butting the workpiece 510 against the holder 4 to position the workpiece 510 and fix the position of the workpiece 510. Note that, in this embodiment, the distance L1 calculated in Step S603 of FIG. 6 is obtained by Equation 1, and θ1 in Equation 1 is the rotation angle of the rack gear 512.

Next, description is given of movement control for separating the butting part 509 from the workpiece 510. The power receiver 506 is moved by the moving magnetic field generated by the armature 104. In this case, the movement direction of the power receiver 506 is opposite to that when the butting part 509 is moved toward the workpiece 510. When the power receiver 506 is moved, the power transmitter 508 is linearly moved along the guide 520, and the rack gear 512 is moved along the guide 515 through the rod end 514. With the movement of the rack gear 512, the pinion gear 511 is rotated to move the butting part 509 in a direction of separating from the workpiece 510 through the ball screw 516. Thus, the fixation of the workpiece 510 by the butting part 509 is released.

As described above, in this embodiment, the power receiver 506 and the workpiece fixation unit 505 are provided, and the workpiece fixation unit 505 is operated by the movement of the power receiver 506, thereby controlling the positioning and fixation of the workpiece 510 as well as the release of the fixation of the workpiece 510. Thus, the transfer system can be downsized with a simple configuration without the need to separately provide a mechanism for positioning control of the workpiece 510 on operation step sides.

Sixth Embodiment

Next, a sixth embodiment of the present invention is described with reference to the drawings. This embodiment is different from the first embodiment in including a lifting mechanism. The same configurations as those in the first embodiment are denoted by the same reference numerals, and description thereof is omitted.

Figure 13:
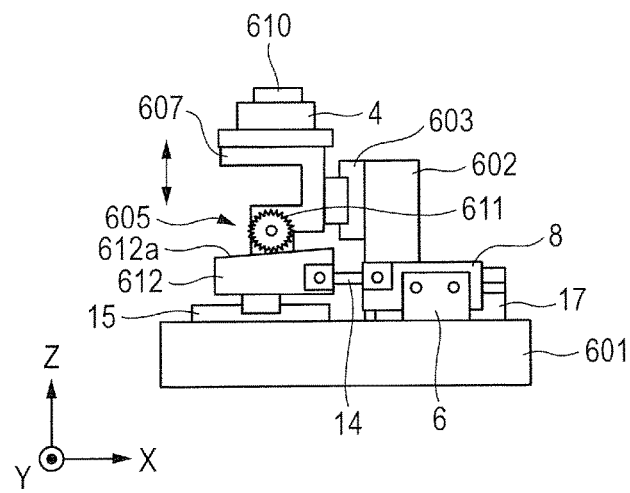
FIG. 13 is a schematic diagram showing a transfer system according to a sixth embodiment of the present invention.

FIG. 13 is a schematic diagram of a carriage 601 in a transfer system 10 according to this embodiment. The carriage 601 includes an orientation converter 605. The orientation converter 605 includes a stationary body 602, a guide 603, a pinion gear 611, a rack gear 612, and a support 607. The stationary body 602 is provided upright on the carriage 601, and the guide 603 is provided in the upper part facing the support 607. The guide 603 supports the support 607 so as to be movable up and down, and guides the up-and-down movement of the support 607. The support 607 is attached to the rack gear 612 so as to be movable on the rack gear 612 with the rotation of the pinion gear 611.

The pinion gear 611 is rotatably supported by the support 607. The rack gear 612 is connected to the rod end 14 and can be moved in the movement direction of the carriage 601 along the guide 15 through the rod end 14 by the linear movement of the power transmitter 8. The rack gear 612 is formed into a trapezoid, and grooves to be engaged with the pinion gear 611 are formed in an inclined surface 612*a*. The holder 4 is provided on the support 607.

When the power receiver 6 is moved, the power transmitter 8 is moved in the X-axis direction along the guide 17, and the rack gear 612 is linearly moved in the X-axis direction along the guide 15 through the rod end 14. With the movement of the rack gear 612, the pinion gear 611 is moved in the Z-axis direction on the inclined surface 612*a* of the rack gear 612, and the support 607 is moved in the Z-axis direction along the guide 603. Thus, the workpiece 610 is lifted or lowered. The workpiece 610 is lowered by moving the pinion gear 611 in a downward direction (−Z-axis direction) on the inclined surface 612*a* of the rack gear 612. On the other hand, the workpiece 610 is lifted by moving the pinion gear 611 in an upward direction (+Z-axis direction) on the inclined surface 612*a* of the rack gear 612.

As described above, in this embodiment, the rack gear 612 is moved along with the movement of the power receiver 6, and the pinion gear 611 is moved on the inclined surface 612*a* while being engaged with the rack gear 612. Thus, the orientation of the workpiece 610 can be changed up and down.

Seventh Embodiment

Next, a transfer system according to a seventh embodiment of the present invention is described with reference to the drawings. In this embodiment, the lifting mechanism according to the sixth embodiment is combined with the transfer system according to the first embodiment. The same configurations as those in the first and sixth embodiments are denoted by the same reference numerals, and description thereof is omitted.

Figure 14:
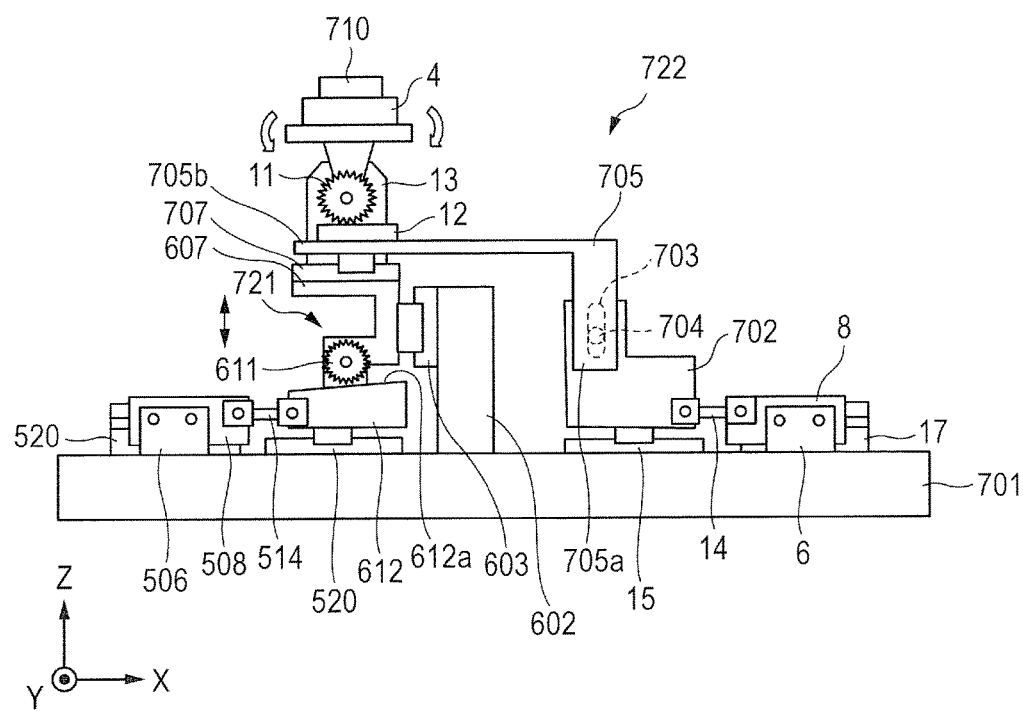
FIG. 14 is a schematic diagram showing a transfer system according to a seventh embodiment of the present invention.

FIG. 14 is a schematic diagram of a carriage 701 in a transfer system 10 according to this embodiment. The carriage 701 includes a power receiver 506, a power transmitter 508, a guide 520, a first orientation converter 721, and a second orientation converter 722. The first orientation converter 721 includes a stationary body 602, a guide 603, a support 607, a pinion gear 611, a rack gear 612, and a guide 707. The guide 707 is provided on an upper surface of the support 607. The second orientation converter 722 includes a stationary body 702 and a bracket 705. The stationary body 702 is connected to the power transmitter 8 through the rod end 14, and is moved in the X-axis direction along the guide 15 when the power receiver 6 is moved in the X-axis direction along the guide 17.

A grooved cam 703 is formed in an upper end of the stationary body 702. A cam follower 704 guided by the grooved cam 703 is formed at an end 705*a* of the bracket 705. The rack gear 12 is attached to the upper surface of an end 705*b* of the bracket 705. The bracket 705 can be moved in the X-axis direction along the guide 707. In the bearing 13, the pinion gear 11 is attached to a position to be engaged with the rack gear 12.

When the power transmitter 8 is linearly moved in the X-axis direction by the movement of the power receiver 6, the stationary body 702 is linearly moved in the X-axis direction along the guide 15 through the rod end 14. Thus, the bracket 705 is moved in the X-axis direction along the guide 707, and the rack gear 12 is moved in the X-axis direction. Accordingly, the holder 4 is tilted in the X-axis direction and the workpiece 710 is tilted in the X-axis direction by the rotation of the pinion gear 11.

When the power transmitter 508 is linearly moved in the X-axis direction by the movement of the power receiver 506, the rack gear 612 is linearly moved in the X-axis direction through the rod end 514. Thus, the pinion gear 611 is moved on the inclined surface 612*a* of the rack gear 612, and the support 607 is lifted or lowered. With the lifting or lowering of the support 607, the cam follower 704 is moved inside the grooved cam 703, and the bracket 705 is moved in the same direction as the support 607.

As described above, the carriage 701 includes the first orientation converter 721 for lifting the workpiece 710 and the second orientation converter 722 for changing the orientation of the workpiece 710. Thus, the same effect as the first embodiment can be achieved without the need to provide mechanisms for lifting and changing the orientation of the workpiece 710 for each operation step.

Eighth Embodiment

Figure 15:
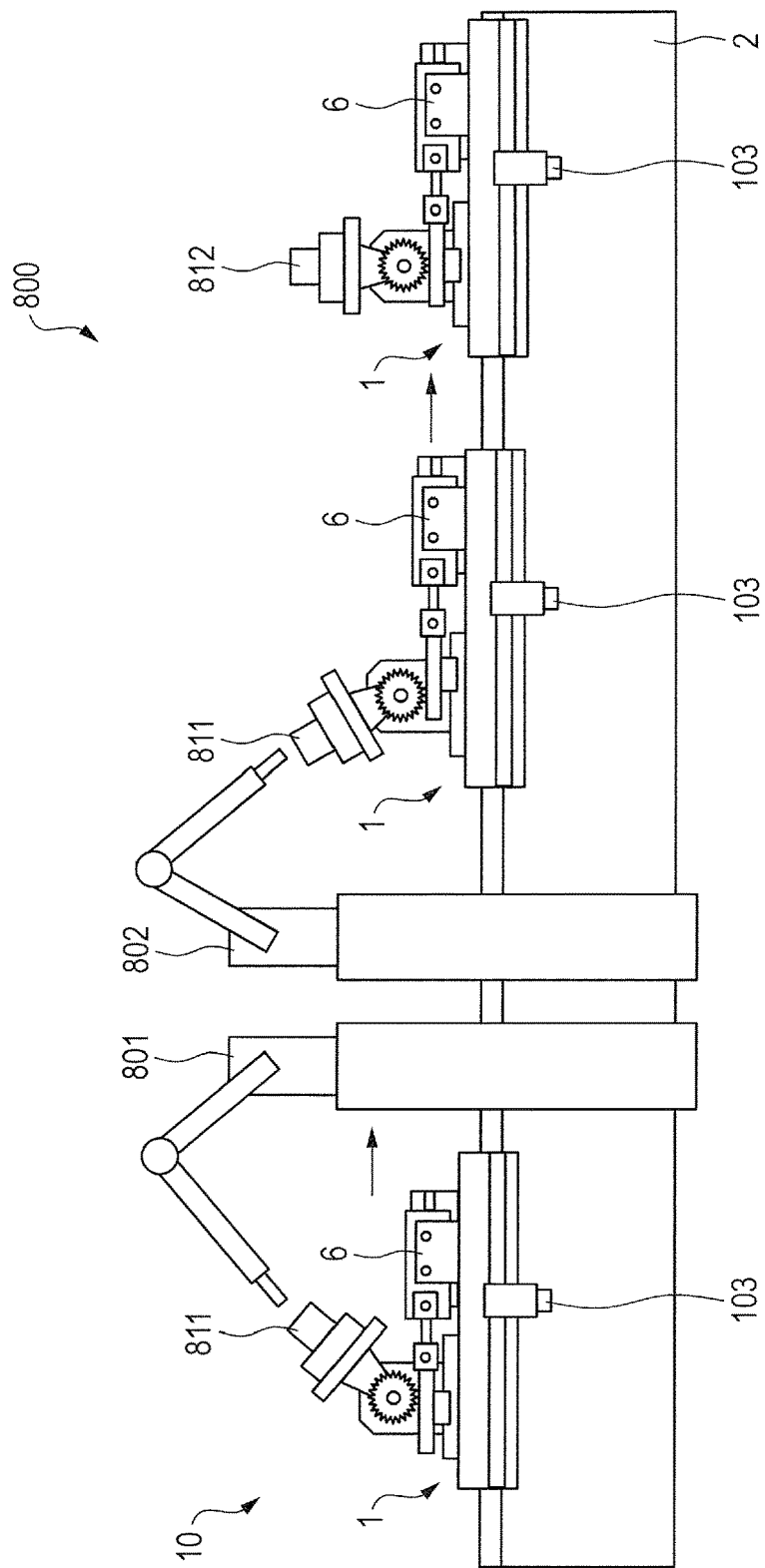
FIG. 15 is a schematic diagram showing a manufacturing system including a transfer system according to an eighth embodiment of the present invention.

Next, description is given of a goods manufacturing system 800 including a transfer system 10 according to an eighth embodiment of the present invention. FIG. 15 is a schematic diagram showing the manufacturing system including the transfer system according to this embodiment. The goods manufacturing system 800 includes the transfer system 10 according to the first embodiment, a first processing apparatus 801, and a second processing apparatus 802. The manufacturing system 800 transfers a workpiece 811 between the first processing apparatus 801 and the second processing apparatus 802. The goods in this embodiment are products to be obtained by processing the workpiece 811. The number of the processing apparatuses 801 and 802 included in the manufacturing system 800 is not limited thereto.

A method for manufacturing the goods by the manufacturing system 800 is described. The CPU 100 transfers the carriage 1 to the first processing apparatus 801 based on the positional information of the carriage 1 acquired from the position detection unit 103 and the position command for the carriage 1. In the first processing apparatus 801, the movement control of the power receiver 6 is performed as described in the first embodiment. Thus, the orientation of the workpiece 811 is tilted toward the first processing apparatus 801, and the first processing apparatus 801 performs processing for the workpiece 811.

After completion of the processing by the first processing apparatus 801, the CPU 100 transfers the carriage 1 to the second processing apparatus 802 based on the positional information of the carriage 1 acquired from the position detection unit 103 and the position command for the carriage 1. In the second processing apparatus 802, the movement control of the power receiver 6 is performed. Thus, the orientation of the workpiece 811 is tilted toward the second processing apparatus 802, and the second processing apparatus 802 performs processing for the workpiece 811. Finally, a product is manufactured as each piece of goods 812.

As described above, in this embodiment, the goods 812 is manufactured by changing the orientation of the workpiece 811 placed on the carriage 1 according to the processing by using the transfer system 10 according to the first embodiment. Thus, the manufacturing system 800 can be downsized and simplified.

The present invention is not limited to the above embodiments, but various modifications can be made thereto. For example, in the above embodiments, the description has been given of the change in orientation angle of the workpiece, positioning of the workpiece, and lifting and lowering of the workpiece by transmitting the power obtained by the power receiver to the orientation converter. However, the conversion mode of the orientation converter is not limited thereto. Moreover, the present invention is not limited to the operation of the orientation converter described in the above embodiments, but may be combined with a conversion mechanism for converting the operation of the rack gear into operations of the workpiece in the Y-axis direction and Z-axis direction.

Moreover, in the fifth embodiment, the two power receivers are provided to perform the two-axis operation of the mechanism for the orientation conversion of the workpiece, positioning and fixing of the workpiece, and release thereof. However, another power receiver may be further provided to add an operable axis, and a mechanism for converting such an operation may be added. Furthermore, in the third embodiment, the fixing magnet 82a is provided in the lock unit 80a to fix the power transmitter 8. However, the present invention is not limited thereto as long as the power transmitter 8 can be fixed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-135910, filed Jul. 7, 2015, which is hereby incorporated by reference herein in its entirety.

What is claimed is:

1. A transfer system comprising:
   a stator including a plurality of coils; and
   a carriage having a carriage drive magnet arranged facing the plurality of coils and a power transmitter fixed to the carriage, wherein the carriage includes a power receiver to which a power receiving magnet arranged facing the plurality of coils is fixed and which is connected to the power transmitter.

2. The transfer system according to claim 1, wherein the stator includes a plurality of position detection units configured to detect positions of the carriage and the power receiver.

3. The transfer system according to claim 1, wherein the power receiver includes a plurality of power receiving magnets.

4. The transfer system according to claim 1, wherein the power receiver is movably provided on the carriage, and
   the carriage further includes a lock unit configured to restrict movement of the power receiver.

5. The transfer system according to claim 4, wherein the power receiver is formed of a magnetic member, and
   the lock unit includes a magnet configured to fix the power receiver.

6. The transfer system according to claim 5, wherein the lock unit includes an adjuster configured to adjust a position of the magnet.

7. The transfer system according to claim 1, wherein a pair of the carriage drive magnets is disposed facing each other across the coils, and
   the carriage includes a plurality of pairs of the carriage drive magnets.

8. The transfer system according to claim 1, wherein the carriage includes a plurality of the power receivers.

9. The transfer system according to claim 1, wherein the stator includes a position detection unit configured to detect position of the carriage or the power receiver.

10. A goods manufacturing method using a transfer system that includes, a stator including a plurality of coils, and a carriage having a carriage drive magnet arranged facing the plurality of coils and a power transmitter fixed thereto, wherein the carriage includes a power receiver to which a power receiving magnet arranged facing the plurality of coils is fixed and which is connected to the power transmitter, the goods manufacturing method comprising:

driving the carriage by moving the carriage drive magnet with magnetic force generated by the plurality of coils provided in the stator;

driving the power receiver by moving the power receiving magnet with respect to the carriage drive magnet with magnetic force generated by the plurality of coils to orient a manufacturing object placed on the carriage; and performing a predetermined processing on the object placed on the carriage after the driving the power receiver to orient the object for the predetermined processing.

11. A method for controlling a transfer system that includes a stator including a plurality of coils; and a carriage having a carriage drive magnet arranged facing the plurality of coils and a power transmitter fixed to the carriage, wherein the carriage includes a power receiver to which a power receiving magnet arranged facing the plurality of coils is fixed and which is connected to the power transmitter, the method comprising:

driving the carriage by moving the carriage drive magnet with magnetic force generated by the plurality of coils provided in the stator; and driving the power receiver by moving the power receiving magnet with respect to the carriage drive magnet with magnetic force generated by the plurality of coils.

* * * * *